No. 777,092. PATENTED DEC. 13, 1904.
J. H. HALLBERG.
SYSTEM OF ELECTRICAL DISTRIBUTION FOR ELECTRIC RAILWAYS.
APPLICATION FILED MAR. 26, 1904.
NO MODEL.
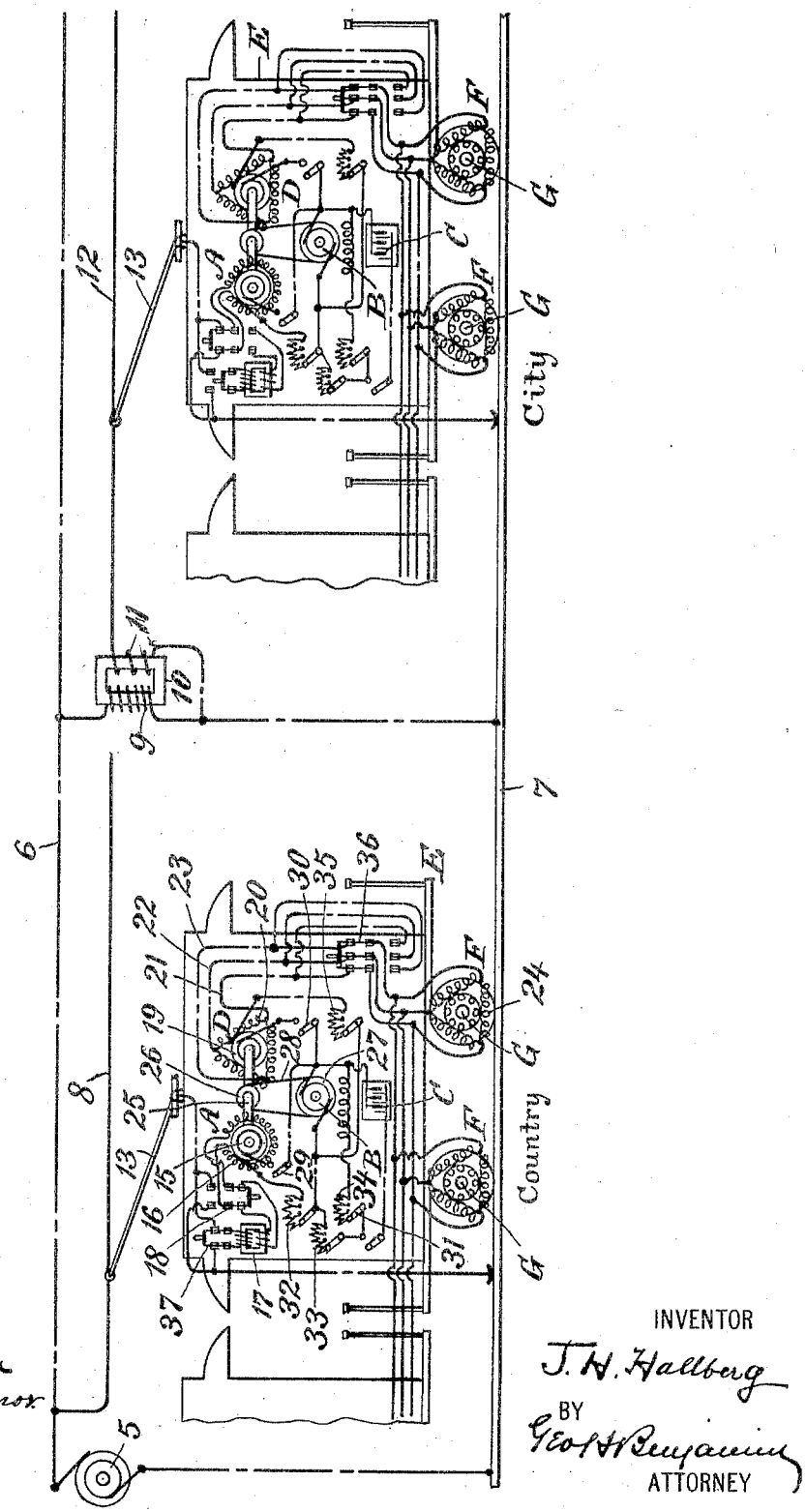
WITNESSES:
J. E. Pearson
Frank O'Connor
INVENTOR
J. H. Hallberg
BY
Geo. H. Benjamin
ATTORNEY No. 777,092. Patented December 13, 1904.

UNITED STATES PATENT OFFICE.

JOSEF HENRIK HALLBERG, OF CINCINNATI, OHIO.

SYSTEM OF ELECTRICAL DISTRIBUTION FOR ELECTRIC RAILWAYS.

SPECIFICATION forming part of Letters Patent No. 777,092, dated December 13, 1904.

Application filed March 26, 1904. Serial No. 200,116. (No model.)

*To all whom it may concern:*

Be it known that I, JOSEF HENRIK HALLBERG, a citizen of the United States, residing at Clifton, Cincinnati, county of Hamilton, State of Ohio, have invented a System of Electrical Distribution for Electric Railways, of which the following is a specification.

My present invention relates to a system of electrical distribution for electric railways wherein a single-phase alternating current is generated and transmitted along the railway and such current at its full voltage or at a reduced voltage employed after conversion into a polyphase current to operate motors to give motion to vehicles upon the railway.

The objects of my invention are, first, to provide means whereby vehicles upon an electric railway may be operated by means of a single-phase alternating current transmitted over a single trolley or feed-wire; second, to provide means whereby such vehicles may be operated at the generated voltage upon country roads or in other localities where high speed may be maintained and where the danger from contact with the conductors is limited and at a reduced voltage within cities or towns where danger from contact is greater; third, to provide motor equipment for the vehicles which may be operated without the employment of commutators or brushes and which may be geared directly to the axles of the vehicles, thereby doing away with objectional gears, permitting high speed and reducing the cost of operation.

The accompanying drawing diagrammatically illustrates my invention as applied to a single-phase alternating-current electric railway.

The drawing shows the railway as divided into two sections, the section at the left indicating a country section or other location where the full generated voltage may be used, the section at the right a city section or other locality where a lower voltage may be used.

In the drawing, 5 indicates an alternating-current generator of the single-phase type, the terminals of which are respectively connected to an outgoing feeder-conductor 6 and the traffic-rails 7. Connected to the feeder-conductor 6 and arranged along the country section of the railway is a contact or working conductor 8. Connected across the feeder-conductor 6 and the traffic-rails 7 in the city section of the railway is the primary 9 of a transformer 10, the secondary 11 of which has one terminal connected to the rail 7 and the other carried parallel with the country section to form a contact or working conductor 12. It will thus be seen that the voltage of the current across the contact-conductor 8 and the traffic-rails 7 of the country section is the full voltage and that across the contact-conductor 12 and the traffic-rails 7 of the city section can be any desired voltage less than the full voltage, or the transformer 10 could be arranged as a step-up transformer, if desired.

Situated upon the traffic-rails are the motor-vehicles E. Two are shown. These vehicles are provided with the usual trolley-contacts 13.

To convert the currents derived from the generator 5 through the contact-conductors 8 12 from a single-phase alternating into a polyphase alternating current, I make use of the following apparatus, which is situated upon the motor-vehicles: a single-phase alternating motor A, having its rotor member 15 connected across a small direct-current generator B and also across a small storage battery C and its stator member 16 arranged to be connected either directly across the contact-conductors 8 12 and the traffic-rails 7 or across the secondary of a transformer 17 through a double-throw switch 18, the primary of which transformer is arranged to be connected across the contact-conductor 8 or 12 and the traffic-rails 7; a polyphase generator D, having its rotor member 19 connected across a small direct-current generator B and its stator member 20 connected to the conductors 21 22 23 and through them to the stator members 24 of the polyphase motors F, geared directly or through gears to the axles G of the vehicle, the rotor members 15 19 of the motor A and polyphase generator D being mechanically connected through a shaft 25, on which is a pulley 26, over which passes a belt 28, that is carried over a pulley 27 on the shaft of the armature of the small direct-current generator B; 29 30 31, controlling-switches; 32 33 34 35, controlling-rheostats; 36, reversing-switch; 37, switch for cutting transformer 17 in and out of circuit with the conductor 8 or 12, and traffic-rails 7.

The operation of my improved system is as follows: When it is desired to excite the apparatus upon the vehicles and, further, to convert a single-phase alternating current of high voltage into a polyphase current of different voltage, the single-phase motors A upon the vehicles are brought into synchronism with the generator 5. This is accomplished by driving the small direct-current generator B as a motor by the current derived from a storage battery C and transmitting the motion of the armature of said generator through the belt 28 and shaft 25 to the rotor members 15 19 of a motor A and polyphase generator D. When generator 5 and motor A are in step, the switch 29 is closed. This causes current from storage battery C to flow through the windings on rotor 15 of motor A, thereby exciting them. When proper voltage of the motor A has been obtained, the switch 18 is thrown to cover the upper pair of contacts if car E is under low-voltage conductor 12, which permits the current from generator 5 to flow from the contact-conductor 12 through trolley-pole 13, stator member 15, and thence to the traffic-rails 7, or when the car E is under high-voltage conductor 8, in which case transformer 17 is in use, over switch 37, through the primary of the transformer to excite it and excite the stator member 16 from the secondary of such transformer through switch 18, which must then cover the lower pair of contacts. After the moter A has been brought up to speed it operates as a single-phase synchronous motor, driving through the shaft 25 the rotor member 19 of the polyphase generator D and also by means of the belt 28 the armature of the small direct-current generator B, the current from which can now be used by closing switch 30 for exciting the rotor members 15 19 of motor A and polyphase generator D and, further, for charging a storage battery C. When it is desired to start a vehicle, the switch 30 is first closed, thereby permitting a small amount of direct current from the direct-current generator B to flow through the rotor member 19 of the polyphase generator D. The effect of this small current in the rotor member 19 is to induce a low voltage in the stator member 20, the currents from which are transmitted through reversing-switch 36 to the stator-windings 24 of the polyphase motors F, thereby inducing movement of their roter members and through them giving motion to the vehicle. By reversing the position of the switch 36 the direction of motion of the vehicle may be altered at will, and by varying the resistance of the rheostat 35 the speed of the vehicle may be changed as desired.

In operating the vehicles upon the railway the transformers 17 may be thrown in circuit upon the country section of the road and out of circuit in the city section, thus varying as desired the voltage of the single-phase current transmitted to the apparatus upon the vehicle.

In a former application relating to the same subject-matter, Serial No. 195,425, filed February 26, 1904, I have given a more detailed description of the mechanism employed upon the vehicle for converting a single-phase current into the polyphase currents used to actuate the vehicle, and hence I make no claim in this application for such portion of my invention.

Having thus described my invention, I claim—

1. A system of electrical distribution, comprising a source of alternating single-phase current, a feeder-conductor and traffic-rails, both connected to said source of current, a contact-conductor connected to said feeder-conductor and extending along certain sections of said railway, a contact-conductor extending along other sections of said railway, means interposed between said last-named contact-conductor and said source of current for modifying the voltage of the current delivered to said last-named contact-conductor.

2. A system of electrical distribution, comprising a source of alternating single-phase current, means for modifying the voltage of said current, means for converting said current into polyphase currents of lower voltage, and polyphase motors actuated by such polyphase currents and adapted to give motion to motor-vehicles upon which they are placed.

3. A system of electrical distribution, comprising a source of alternating single-phase current, means for transmitting said current along a railway, means for modifying said current at certain sections of such railway, means for converting said current into polyphase currents of lower voltage, and polyphase motors actuated by said polyphase currents and adapted to give motion to the motor-vehicles upon which they are placed.

4. A system of electrical distribution, comprising a source of alternating single-phase current, a motor-vehicle, means located on the vehicle for modifying the voltage of said current, means for converting said modified current into polyphase currents of different voltage, and polyphase motors actuated by said polyphase currents and adapted to give motion to motor-vehicles upon which they are placed.

5. A system of electrical distribution, comprising a source of alternating single-phase current, means distributed along the railway for modifying said current, motor-vehicles, means located upon the motor-vehicles for modifying the current fed thereto, means for converting said modified current into polyphase currents of lower voltage, and polyphase motors actuated by said polyphase currents and adapted to give motion to motor-vehicles upon which they are placed.

6. A system of electrical distribution, comprising a generator of alternating single-phase currents, a trackway divided into sections, one section fed from a single-phase current of high voltage and the other section fed from a single-phase current of modified voltage, motor-vehicles situated on said trackway and carrying means for converting said single-phase currents into polyphase currents, and means for imparting motion to said vehicle through the instrumentality of motors actuated by said polyphase currents.

7. A system of electrical distribution, comprising a source of single-phase alternating current, a motor-vehicle, means carried by said motor-vehicle for modifying said single-phase current, means for converting said current into polyphase currents of different voltage, and means connected to the axles of said vehicle for imparting motion to said vehicle when subjected to the action of a polyphase current.

In testimony whereof I affix my signature in the presence of two witnesses.

JOSEF HENRIK HALLBERG.

Witnesses:
MALCOLM McAVOY,
JOHN C. HEALY.